US011995577B2

(12) United States Patent
Villero et al.

(10) Patent No.: US 11,995,577 B2
(45) Date of Patent: May 28, 2024

(54) SYSTEM AND METHOD FOR ESTIMATING A MACHINE'S POTENTIAL USAGE, PROFITABILITY, AND COST OF OWNERSHIP BASED ON MACHINE'S VALUE AND MECHANICAL STATE

(71) Applicant: Caterpillar Inc., Peoria, IL (US)

(72) Inventors: David A. Villero, Champaign, IL (US); Kyle J. Cline, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 96 days.

(21) Appl. No.: 17/686,211

(22) Filed: Mar. 3, 2022

(65) Prior Publication Data

US 2023/0280738 A1 Sep. 7, 2023

(51) Int. Cl.
*G06Q 10/04* (2023.01)
*G05B 23/02* (2006.01)
*G06Q 10/063* (2023.01)
*G06Q 10/0631* (2023.01)

(52) U.S. Cl.
CPC ......... *G06Q 10/04* (2013.01); *G05B 23/0283* (2013.01); *G05B 23/0294* (2013.01); *G06Q 10/063* (2013.01); *G06Q 10/06312* (2013.01)

(58) Field of Classification Search
CPC . G06Q 10/04; G06Q 10/063; G06Q 10/06312
See application file for complete search history.

(56) References Cited

U.S. PATENT DOCUMENTS

| 7,711,522 | B2 | 5/2010 | Gualandri et al. |
| 8,688,332 | B2 * | 4/2014 | Reiners ................. E02F 9/2054 701/50 |
| 9,773,251 | B2 | 9/2017 | Liu et al. |
| 10,332,208 | B1 * | 6/2019 | Loo ........................ G06Q 40/08 |
| 10,657,707 | B1 | 5/2020 | Leise |

(Continued)

FOREIGN PATENT DOCUMENTS

| CN | 108255059 A * | 7/2018 | .......... G05B 13/042 |
| KR | 20190101677 A * | 9/2019 | |

(Continued)

OTHER PUBLICATIONS

Dodson et al., "Montana logging machine rates" International Journal of Forest Engineering, 2015 (Year: 2015).*

(Continued)

*Primary Examiner* — John C Kuan

(57) ABSTRACT

Techniques are provided that include receiving sensor data from sensors of the machine, service history data, previous dealership data, and owner input data. The techniques include generating a state of the machine and a state of each of individual components by processing such data. Some of such data are processed to generate the measure of projected productivity of the machine and the estimate of projected maintained life cycle and costs. The generated data are input to the machine optimization module to generate the optimal performance level of the machine and data indicative of the optimal performance level of the machine, which are processed to generate productivity data of the machine, which are transmitted to a customer-facing application for display or post-processing.

17 Claims, 6 Drawing Sheets

(56) References Cited

U.S. PATENT DOCUMENTS

| | | | |
|---|---|---|---|
| 2004/0073405 A1* | 4/2004 | Karasawa | G05B 23/0283 |
| | | | 702/188 |
| 2007/0078791 A1* | 4/2007 | Vyas | G06Q 30/0283 |
| | | | 705/400 |
| 2009/0299707 A1* | 12/2009 | Putkonen | G06Q 10/06 |
| | | | 703/2 |
| 2015/0226584 A1* | 8/2015 | Bjornson, Jr. | G06Q 10/20 |
| | | | 702/187 |
| 2016/0257310 A1 | 9/2016 | Sprock et al. | |
| 2016/0292846 A1 | 10/2016 | Sprock et al. | |
| 2017/0323403 A1* | 11/2017 | Johnson | G06Q 10/06314 |
| 2017/0349058 A1 | 12/2017 | Bernier et al. | |
| 2019/0251759 A1 | 8/2019 | Lora et al. | |
| 2021/0056575 A1* | 2/2021 | Mintz | G06F 3/0481 |

FOREIGN PATENT DOCUMENTS

| | | | |
|---|---|---|---|
| KR | 20210099932 A * | 8/2021 | |
| WO | 2019171337 A1 | 9/2019 | |
| WO | 2022010787 A1 | 1/2022 | |

OTHER PUBLICATIONS

Ackerman et al., "The COST model for calculation of forest operations costs" International Journal of Forest Engineering, 2014 (Year: 2014).*

Written Opinion and International Search Report for Int'l. Patent Appln. No. PCT/US2023/062243, dated May 26, 2023 (15 pgs).

* cited by examiner

SYSTEM AND METHOD FOR ESTIMATING A MACHINE'S POTENTIAL USAGE, PROFITABILITY, AND COST OF OWNERSHIP BASED ON MACHINE'S VALUE AND MECHANICAL STATE

TECHNICAL FIELD

The present disclosure relates to industrial machine usage, and more specifically, to systems and methods for estimating an industrial machine's potential usage, profitability, and cost of ownership based on the industrial machine's value and mechanical state using sensor information and other information about and from the industrial machine.

BACKGROUND

Often times, towards the end of an industrial machine's life cycle, it is hard to estimate the value and the physical state of the machines by just looking at the number of an engine's running hours or the number of times the machine has been serviced. Industrial machines perform various applications that slowly wear off components and physical structures such as frames, booms, sticks, tracks, gears, and more. Further, there is no process or mechanism to estimate the machine's potential usage profitability and cost of ownership based on the machine's physical and mechanical state using sensor information and other information about and from the industrial machine.

For example, WO2019171337 A1, Vehicle Monitoring System and Method (published 12 Sep. 2019) to Rikatec (PTY) LTD. (hereinafter "Rikatec"), describes a vehicle monitoring system which includes an information module and a prediction/estimation module. The information module is configured to receive information on at least one vehicle. The information includes vehicle operation information. The prediction/estimation module which is configured to predict/estimate (a) a remaining life/lifespan of one or more operational components/arrangements of the vehicle, by utilizing the received information, and/or (b) a remaining time before service/maintenance is required, of one or more operational components/arrangements of the vehicle, by utilizing the received information. The prediction/estimation module may be configured to utilize a wear prediction formula(s)/algorithm(s) in order to predict/estimate the remaining life/lifespan of the one or more operational components/arrangements. The prediction/estimation module may also be configured to utilize a wear prediction formula(s)/algorithm(s) in order to predict/estimate the remaining time before service/maintenance is required, of the one or more operational components/arrangements.

The disclosure of Rikatec lacks, among other things, estimating the machine's potential usage profitability and cost of ownership based on the machine's physical and mechanical state using sensor information and other information about and from the industrial machine.

SUMMARY

In some embodiments, a method for computing a machine's potential usage, profitability, and cost of ownership by processing sensor data can include receiving, at a network-accessible server processor and from a machine at a jobsite of a customer, sensor data from one or more sensors of the machine; further receiving, at the network-accessible server processor, service history data, previous dealership data, and owner input data; inputting, by a network-accessible server processor, the received sensor data, service history data, previous dealership data, and owner input data, to a machine state module to generate a state of the machine and a state of each of individual components; inputting, by a network-accessible server processor, the received sensor data, service history data, previous dealership data, and owner input data, to a machine population comparison module to generate a measure of projected productivity of the machine and an estimate of projected maintained life cycle and costs; inputting, by a network-accessible server processor, the state of the machine, the state of each of the individual components, the measure of the projected productivity of the machine and the estimate of the projected maintained life cycle and ownership costs to a machine optimization module to cause an optimal performance level of the machine to be generated and to generate data indicative of the optimal performance level of the machine; inputting, by a network-accessible server processor, the data indicative of the optimal performance level of the machine to a cost of ownership and profitability module to generate productivity data of the machine; and transmitting, by a network-accessible server processor, the productivity data of the machine to a customer-facing application for display or post-processing.

In some embodiments, a system for computing a machine's potential usage, profitability, and cost of ownership by processing sensor data can includes one or more processors, and one or more memory devices having stored thereon instructions that when executed by the one or more processors cause the one or more processors to: receive, at a network-accessible server processor and from a machine at a jobsite of a customer, sensor data from one or more sensors of the machine; further receive, at the network-accessible server processor, service history data, previous dealership data, and owner input data; input, by a network-accessible server processor, the received sensor data, service history data, previous dealership data, and owner input data, to a machine state module to generate a state of the machine and a state of each of individual components; input, by a network-accessible server processor, the received sensor data, service history data, previous dealership data, and owner input data, to a machine population comparison module to generate a measure of projected productivity of the machine and an estimate of projected maintained life cycle and costs; input, by a network-accessible server processor, the state of the machine, the state of each of the individual components, the measure of the projected productivity of the machine and the estimate of the projected maintained life cycle and ownership costs to a machine optimization module to cause an optimal performance level of the machine to be generated and to generate data indicative of the optimal performance level of the machine; input, by a network-accessible server processor, the data indicative of the optimal performance level of the machine to a cost of ownership and profitability module to generate productivity data of the machine; and transmit, by a network-accessible server processor, the productivity data of the machine to a customer-facing application for display or post-processing.

In some embodiments, one or more non-transitory computer-readable media storing computer-executable instructions that, when executed by one or more processors, cause the one or more processors to perform operations. The operations can include receiving, at a network-accessible server processor and from a machine at a jobsite of a customer, sensor data from one or more sensors of the machine; further receiving, at the network-accessible server processor, service history data, previous dealership data, and owner input data; inputting, by a network-accessible server processor, the received sensor data, service history data, previous dealership data, and owner input data, to a machine state module to generate a state of the machine and a state of each of individual components; inputting, by a network-accessible server processor, the received sensor data, service history data, previous dealership data, and owner input data, to a machine population comparison module to generate a measure of projected productivity of the machine and an estimate of projected maintained life cycle and costs; inputting, by a network-accessible server processor, the state of the machine, the state of each of the individual components, the measure of the projected productivity of the machine and the estimate of the projected maintained life cycle and ownership costs to a machine optimization module to cause an optimal performance level of the machine to be generated and to generate data indicative of the optimal performance level of the machine; inputting, by a network-accessible server processor, the data indicative of the optimal performance level of the machine to a cost of ownership and profitability module to generate productivity data of the machine; and transmitting, by a network-accessible server processor, the productivity data of the machine to a customer-facing application for display or post-processing.

DETAILED DESCRIPTION

The present disclosure relates to determining and evaluating industrial machine usage, and more specifically, to systems and methods for estimating an industrial machine's potential usage, profitability, and cost of ownership based on the industrial machine's value and mechanical state using sensor information and other information about and from the industrial machine.

Figure 1:
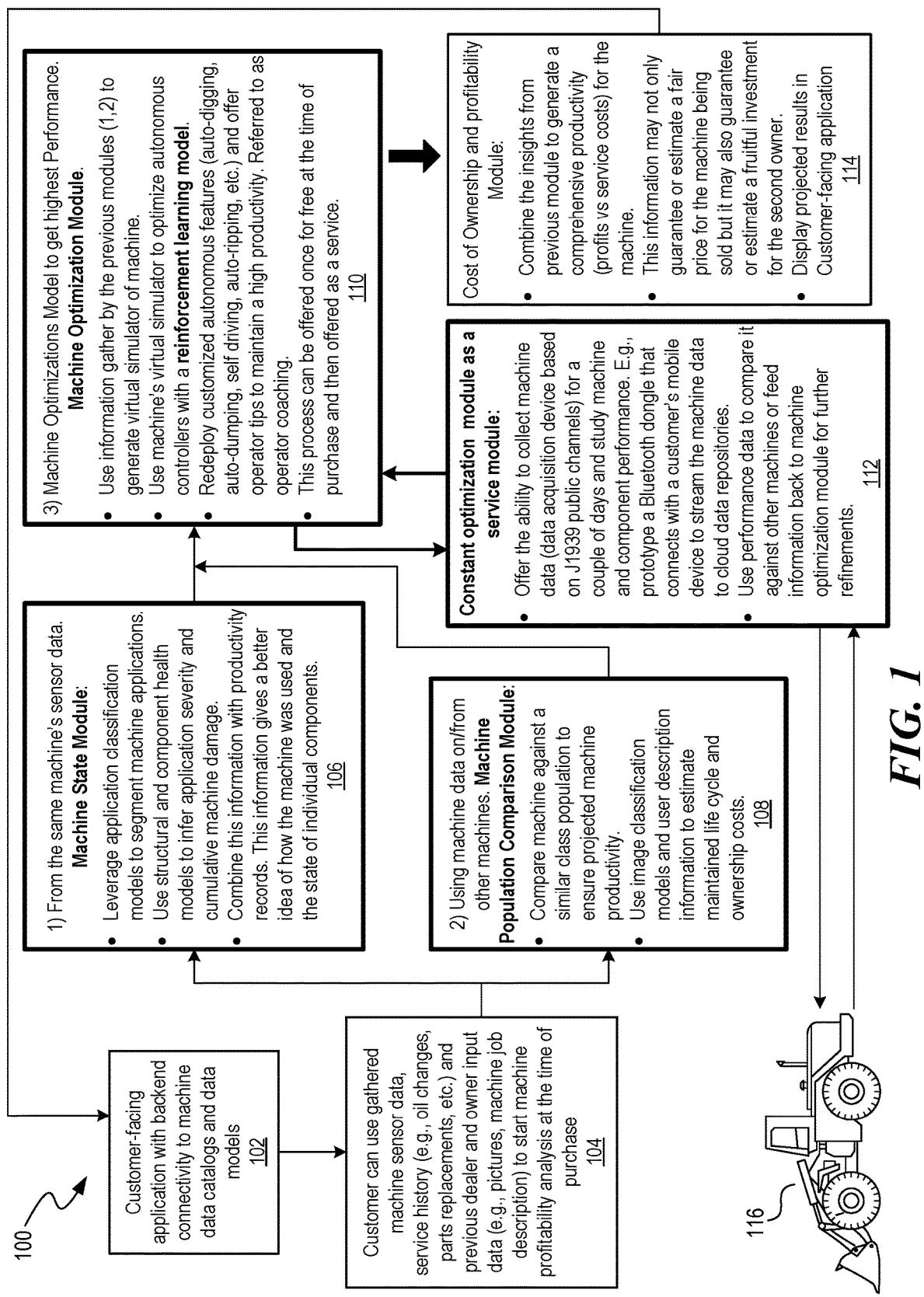
FIG. 1 is a flow diagram showing a process for estimating an industrial machine's potential usage profitability and cost of ownership based on the current machine's physical and mechanical state, according to some embodiments of the disclosed technology.

The disclosed innovation may be understood with reference to FIG. 1, a flow diagram 100 showing a process for estimating an industrial machine's potential usage profitability and cost of ownership based on the current machine's physical and mechanical state according to some embodiments of the disclosed technology. It should be appreciated that the terms industrial machine and machine may be used interchangeably and can be discerned from the context. While the discussion herein refers to an industrial machine, such reference is by example or illustrative purposes and is not meant to be limiting. In an embodiment, an industrial machine may be a type of heavy machinery, a vehicle, a type of construction equipment, and those belonging to a fleet of machines. An example of a provider of equipment such as industrial machines, Caterpillar, INC.

In some embodiments, such machines may be embedded with one or more sensors where the one or more sensors are programmed to detect an aspect (e.g., a machine or component failure of a tractor) of the machine. For instance, one of the tractor's sensors may detect a temperature that is higher than an acceptable threshold and sends a control signal to an operating processor embedded in the tractor, the control signal instructing the tractor to stop, e.g., the control signal determining and transmitting a specific failure event code to the operating processor. Also, before, subsequent to, or parallel to the process of stopping the tractor, the sensor may transmit the sensor data (e.g., reports the telematics sensor data) to a network-accessible server and/or database server ("cloud"), e.g., that is administrated by a company or other entity that provides the tractor and/or the tractor-related service or is otherwise associated with the tractor and/or the tractor-related service, e.g., a third-party entity that handles the telematics aspects of the disclosed innovation. Each of the sensors can be a temperature sensor, a pressure sensor, an accelerometer, a voltameter, a strain gauge, a machine payload sensor, a fluid temperature sensor, a fuel consumption sensor, after treatment/exhausts system sensors and/or any other suitable sensor. Each of the sensors can be configured to detect, receive, and/or otherwise collect telematics data indicative of the machine's performance and associated with the operating characteristics of the corresponding component, such as any of the operating characteristics described herein and/or any other suitable operating characteristics, including any operating characteristics associated with damage, wear, weakening, or failure of the components.

At step 102, a customer-facing application ("application") that has backend connectivity to machine data catalogs and data models on a network-accessible server and/or database server is provided. It should be appreciated that the application in communication with the network-accessible server and/or database server can also be referred to as the system. In some embodiments, the application is a web-application accessed via a browser, a downloadable client that is configured to execute on a standalone computer or a mobile device. Such device examples are illustrative and are not meant to be limiting. In accordance with embodiments herein, examples of data stored in such machine data catalogs include the type of machine, the age of the machine, the age of the parts of the machine, part numbers, controller's software versions, controller diagnostics, service and parts replacement history, and historical data from the type of sensors described above. In accordance with embodiments herein, examples of the data models include, but are not limited to, machine application classification models, structural and component health models, similar class population models, image classification models, maintained life cycle and ownership cost models. Detailed descriptions of such models in accordance with embodiments herein are described hereinbelow.

At step 104, in accordance with embodiments herein, the customer user can use, via the customer-facing application to the cloud, gathered machine sensor data (e.g., made available to the network-accessible server and/or database server via the telematics mechanism and telematics data), service history (e.g., number of oil changes, types of parts replacements, etc., made available to the network-accessible server and/or database server via customer input to the application or via third-party input such as from dealerships)

and previous dealer and owner input data (e.g., uploaded pictures or digital images, input text having machine job description) to start machine profitability analysis process or module at the time of purchase. In an embodiment, machine profitability analysis process can be initiated by a selectable graphical user interface (GUI) element on a page of the application. In another embodiment, the machine profitability analysis process can be initiated automatically by the system on a periodic basis (e.g., once a week) or based on a trigger (e.g., such as when new information associated with the machine is provided to the network-accessible server and/or database server, for instance when the machine had an oil change). In an embodiment, the machine profitability analysis process is the process illustrated in FIG. 1.

At step 106, in an embodiment, input from the machine's sensor data is provided to a machine state module, which performs the following operations. The machine state module: leverages application classification models to segment machine applications, where the input is a time window of the machine's sensor data and the output is the predicted application the machine was performing during that time; processes structural and component health models to infer application severity and cumulative machine damage, where the input is a time window of the machine's sensor data and the output is the cumulative machine damage; and combines such informational data with productivity records. This information gives a better idea of how the machine was used and the state of individual components. In an embodiment, the machine state module resides on the cloud. In other embodiments, such module may reside locally on the computer hosting the mobile application or the computer application.

In accordance with embodiments herein, examples of using application classification models to segment machine applications include, but are not limited to, determining the types of applications that the machine performs. As an example, an excavator model classification system can allow identifying distinctive excavator applications and segments such as digging, dumping, trenching, ripping, demolishing, mass excavation, scrapping, etc. After such identification, an output of the model can be used to determine different operating patterns among multiple operators and improve them. For example, after classifying digging segments of a wheel loader's work cycle, the module can study the command patterns used to perform digging to come up with an optimized sequence of tailored commands for the current operator. This way, the machine can achieve the highest possible payload per dig, while minimizing tire slip and amount of time at maximum load as this is considered as wear and tear of the machine.

In accordance with embodiments herein, examples of processing structural and component health models to infer application severity and cumulative machine damage include, but are not limited to, inputting machine data (e.g., type of machine or type of component) into such models and receiving output that is reflective of an estimated severity and/or cumulative machine damage to the machine or component. For instance, a hammer component might degrade more quickly than other components of a machine because of the pounding action such hammer performs on the ground. In an embodiment, a structural and component health model is provided for each type of machine. Such models employ learning models that have collected information about a particular machine over time and process such learned data to generate and output estimated severity and machine damage values for that machine. Such model can determine the state of a particular subcomponent of the machine in terms of structural life remaining or performance level. For example, the model can predict that a 5-year-old excavator's engine can yield 3000 more hours at the current cycle productivity.

In accordance with embodiments herein, examples of combining such informational data with productivity records include, but are not limited to, taking output from the process of segmenting machine applications and the output from inferring, estimating, or determining application severity and cumulative machine damage and combining or comparing with the particular machine's productivity records. For instance, a prediction of 3000 more hours of an excavator current performance can be determined to be 576 tons/hour, with a decreasing productivity rate of 2% every 100 hours, if the machine is not services after 3000 hours. Thus, if the outcome of the combining or comparing indicates that the particular machine performed worse than the average for such machine, then such indicated value will be reflected in the estimated or computed future performance and/or future profitability of the machine. For instance, the process might determine that the machine's hammer is in a worse condition than the computed estimation of what the condition of the hammer should be, given its productivity records.

Thus, it should be appreciated that this analysis process is configured to provide output reflective of how the machine was used and the state of each individual component.

At step 108, an embodiment includes processing machine data on or from other machines as input to a machine population comparison module. In accordance with embodiments herein, the machine population comparison module performs the following operations: comparing the machine against a similar class population to ensure projected machine productivity; and processing image classification models and user description informational input to compute an estimate of the maintained life cycle and ownership costs. In an embodiment, the machine population comparison module resides on the cloud. In other embodiments, such module may reside locally on the computer hosting the mobile application or the computer application. Examples of inputs to this module are: the average productivity/performance for different applications that the machine itself has performed so far (for a wheel loader: 1,395 tons/hour, for mining truck: 40 gal/hour at full capacity and an average speed of 8 mph), the average productivity/performance of machines of similar age and the same class, images of some of the most important structural modules of the machine, and the users description of the working material. For example, for a large mining truck, if given the expected type of work, the module generates a report comparing the performance of the mining truck with trucks of the same class in similar environments.

In accordance with embodiments herein, processing machine data on or from other machines as input to a machine population comparison module includes, but is not limited to, obtaining (such as pulling or have pushed thereto) data from machines that are within a tolerance of similarity to the machine, where the machines are determined from certain specifications. For instance, an embodiment can include obtaining machine data from the particular machine and from a fleet of similar machines within a same company or enterprise. An example of a similar class population is the type of hammers that are used across similar machines in the company or fleet. As another example of a similar class population is the type of equipment (e.g., an excavator) across similar excavators of the enterprise as well as external and anonymous to the enterprise. Thus, for example, the system might compare a particular excavator that is three (3) years old to other excavators that are also within a predetermined tolerated range of three years old. Then, the system can compute a determination that the particular excavator is in good condition as compared to the other excavators or in a worse (or same) condition as compared to the other excavators.

In accordance with embodiments herein, processing image classification models and user description informational input to compute an estimate of the maintained life cycle and ownership costs includes, but is not limited to, obtaining user input about the particular machine and inputting such input into such model. Examples of such input include, but are not limited to, digital photographs or images of the machine or specific components of the machine and text (structured or nonstructured) entered by the user that describes one or more states of the machine. For instance, the user might take a digital photograph of the bucket teeth in an excavator, where a couple teeth are broken or missing, this can give the module information about the condition of the bucket.

Thus, in accordance with embodiments herein, due to such models, the system provides output that indicates a computed projected machine productivity value (e.g., the number of months or years remaining that the machine can function or a computed estimation of the number of months or years the components of the machine can continue to operate at an optimal level) with the bucket at this stage of degradation. Another example could be a wheel loader with old tires. This would decrease the productivity because the wheel loader would experience more tire slip and will need to work harder to work the material. However, the module will still generate a projected productivity with the current wheel loader's condition. Further, the system can provide computed output that indicates an estimate of the maintained life cycle and ownership costs. Examples of such output include, but are not limited to, the number of maintenance jobs remaining, the estimated costs, and the estimated number of times one or more components may need replacing and the estimated costs thereof and a tradeoff comparison of the required maintenance cost and the expected productivity of the machine. For example, in the case of a mining truck that has lived X (e.g., 20,000) hours (specified interval from design and maintenance target), one can expect to see at least one engine rebuild service and the corresponding oil, brakes, and tire services.

At step 110, an embodiment includes processing a machine optimization model to obtain the highest performance possible. In accordance with embodiments herein, the machine optimization module performs the following operations: processing informational data gathered by the previous modules (1—machine state module and 2—machine population comparison module) to generate a virtual simulator of the machine; processing the machine's virtual simulator to optimize autonomous controllers with a reinforcement learning model; redeploying customized autonomous features (e.g., auto-digging, auto-dumping, self-driving, auto-ripping, etc.) and offering operator tips to maintain a high productivity, referred to as operator coaching; and (optionally) offering such process of the model once for free at the time of purchase and then offered as a paid service. In an embodiment, the machine population comparison module resides on the cloud. In other embodiments, such module may reside locally on the computer hosting the mobile application or the computer application. For example, a model for an auto-digging feature of a wheel loader can require the following inputs from an already recorded work cycle: average distance to a pile, average approaching velocity, pile shape and multiple subcomponents sensor values (cylinder pressures, engine RPM, transmission gear commands, etc.). The module uses a virtual replica of the machine with updated information about subcomponents, wear and tear and a reinforcement learning algorithm such as Proximal Policy Optimization (PPO) or Deep Q-networks (DQN) to train an AI controller (Neural Network) that will generate digging commands to optimally dig into a pile. An embodiment of a reinforcement learning process can be understood with reference to FIG. 5, described in further detail below.

Figure 6:
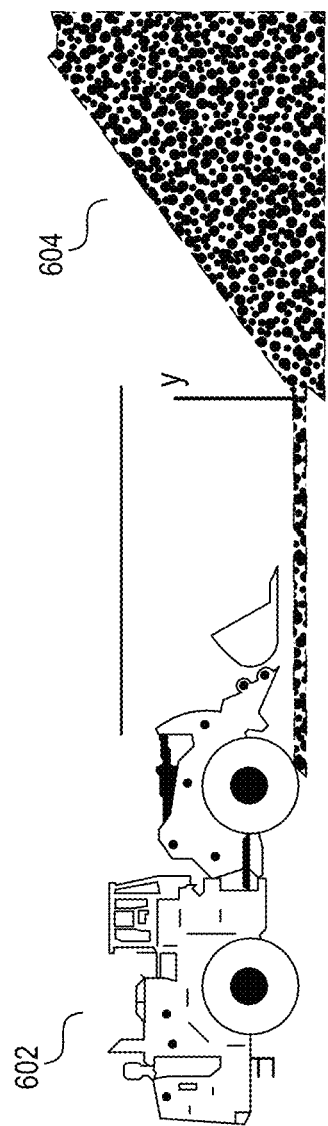
FIG. 6 is a virtual replica of the machine digging into a simulated pile of dirt, according to some embodiments of the disclosed technology.

In accordance with embodiments herein, processing informational data gathered by the previous modules (1—machine state module and 2—machine population comparison module) to generate a virtual simulator of the machine includes, but is not limited to, creating a computer environment in which the machine can simulate performing the functionality that the real-life machine performs. For instance, the virtual simulator can mimic the machine employing the hammer to break a rock, based on the condition of the machine as determined from the output of the machine state module and the output of the machine population comparison module. The virtual simulator is a physics model that simulates the behavior of the machine (including the behavior of the main components, such as the engine, transmission, after treatment system, power train, etc.) and the multiple physical interactions when the machine performs a task. For example, the simulator will record all the interactions for a virtual replica of the machine digging into a simulated pile of dirt, as depicted in FIG. 6 described hereinbelow.

In accordance with embodiments herein, processing the machine's virtual simulator to optimize autonomous controllers with a reinforcement learning model includes, but is not limited to, taking certain output from processing the virtual simulator as concerns particular autonomous controllers and feed such output as input to one or more reinforcement learning models to obtain, from such learning models, optimization values for the autonomous controllers. Following are some examples of autonomous controllers: auto-digging, auto-dumping, self-driving, auto-ripping, and grade control.

In accordance with embodiments herein, redeploying customized autonomous features (e.g., auto-digging, auto-dumping, self-driving, auto-ripping, etc.) and offering operator tips to maintain a high productivity, referred to as operator coaching, includes, but is not limited to, reconfiguring the specifications for auto-digging, auto-dumping, self-driving, auto-ripping, etc. Further, such redeploying includes, but is not limited to, providing tip notifications that are audible, displayable on a device screen, or written and described in a readable report. For instance, one such tip might be to inform the user, when manually driving the machine, to drive the machine at a particular speed, so as not to consume more gas or electricity than necessary. The autonomous feature can be updated/retuned based on data from the current machine's state. Once the feature is retrained/retuned, it can be reinstalled remotely on the machine. For example, for a wheel loader, one can use information about the shape/state of the bucket (deformed bucket, or missing teeth), the current average fuel consumption per hour, the current cycle productivity (tons/hour), and multiple component sensor values (cylinder pressures, engine RPM, transmission gear commands, etc.) to construct a virtual replica of the machine and optimize the auto digging feature for the used machine.

In accordance with embodiments herein, offering the process of the machine optimization model once for free at the time of purchase and then offered as a paid service is by way of example and is not meant to be limiting. For example, an embodiment may omit this optional offering altogether. In another embodiment, the offer might be for three free uses of the model before having to pay to continue. In another embodiment, the payment structure might be gradual, increasing by a particular percentage each use, until a maximum percentage is met.

At step 114, an embodiment includes processing a cost of ownership and profitability module to obtain a cost of ownership and profitability value. In accordance with embodiments herein, the cost of ownership and profitability module performs the following operations: combining the insights, such as for example the amount of fuel consumed and the time spent on an application like digging into a pile, from the machine optimization module, to generate a comprehensive productivity (e.g., profits vs, service costs) for the machine, where this computed informational data may not only guarantee or estimate a fair price for the machine being sold but may also guarantee or estimate a fruitful investment for the second owner; and displaying projected results in the customer-facing application. In an embodiment, the cost of ownership and profitability module resides on the cloud and transmits the results to the customer-facing application for display on such application. In other embodiments, such module may reside locally on the computer hosting the mobile application or the computer application. The customer facing application gathers information provided by the customer on the potential machine usage (e.g. type of application that the machine will mostly perform, the type of material the machine will work with, environmental information of the machine's main location) and associates it with the machine's historical records to generate an accurate virtual simulation. The simulation iterates through multiple scenarios to optimize the machine's productivity and provide a potential profit and operational usage suggestion, (e.g. a series of command patterns that will help the operator use the pre-owned machine at its full potential considering its degraded state, while reducing further wear and tear).

In accordance with embodiments herein, combining the insights from the machine optimization module to generate a comprehensive productivity (e.g., profits vs. service costs) for the machine, where this computed informational data may not only guarantee or estimate a fair price for the machine being sold but may also guarantee or estimate a fruitful investment for the second owner includes, but is not limited to, taking the output of the machine optimization module (e.g., data from the optimized autonomous controllers using the reinforcement learning model; data from the redeployment of the customized autonomous features; and/or the operator coaching data) and ingesting such data to the cost of ownership and profitability module. Essentially, the ownership and profitability module uses the optimized cycle productivity and the information on the potential machine usage to construct a cost-benefit analysis that evaluates the true value of the investment. For example, if a customer plans on buying a used wheel loader coming from heavy construction applications, for about $150,000, and they plan to use the machine for the next four years to move sand, the model uses this information along with engineering data from the wheel loader to extrapolate the potential cost of ownership and the potential profitability of the job to come up with the value of the customer's investment opportunity. Another example of the generated productivity includes generating and providing the breakdown of the maintenance history of the machine and each of its components, such as for example a listing for each instance in which the machine and/or a component was treated.

In accordance with embodiments herein, displaying projected results in the customer-facing application includes, but is not limited to, formatting the results according to predetermined criteria and transmitting the formatted results to the customer-facing application. Examples of such results are provided above, in the discussion of generating comprehensive productivity for the machine.

At step 112, an embodiment includes processing a constant optimization module as a service module. In accordance with embodiments herein, the constant optimization module performs the following operation: offering the ability to collect machine data (e.g., data acquisition device based on J1939 public channels) for a predetermined amount of time (e.g., for a couple of days) and to study the machine and component performance. For example, an embodiment provides a computer-readable component (e.g., a Bluetooth dongle) on the machine that can connect with a customer's mobile device to stream the machine data to cloud data repositories. Further, in accordance with embodiments herein, the constant optimization module performs the following operation: processing performance data and compare such processed data against other machines and/or feed the information back to the machine optimization module for further refinements, in a loop. In an embodiment, the constant optimization module as a service module can resides on the machine or the cloud. Also, in an embodiment, data from and to such module can be received from or transmitted to the machine 116. In other embodiments, such module may reside locally on the computer hosting the mobile application or the computer application. In an embodiment, the module requires information from pressure, temperature, fuel and fluid levels, accelerometer sensors and provide customized software updates.

In accordance with embodiments herein, offering the ability to collect machine data (e.g., using a data acquisition device based on J1939 public channels or protocol) for a predetermined amount of time (e.g., for a couple of days) and to study the machine and component performance includes, but is not limited to, providing a selectable feature (responses from sensors on the machine), with the user's consent, on the customer-facing application for the user. For example, the customer user may select this feature for three days or may select this feature to cover data for five days. Multiple subcomponent and main component sensor data can be recorded while the machine performs the applications requested by the new owner. The collected data can then be used to further tune the virtual simulation and validate the prediction on the potential profitability. For example, having the engine RPM distribution for an application, such as digging, indicates how hard the machine is working or how difficult it is to dig into the target material. Hence, this information can be used to create more realistic simulations.

In accordance with embodiments herein, processing performance data and compare such processed data against other machines and/or feed the information back to the machine optimization module for further refinements includes, but is not limited to, feeding the data back to machine optimization model to obtain fresh output, such as redeployment output, and to transmit such output back to the machine 116. Further, in an embodiment, the processed performance data may be compared with standardized data that is stored in a repository on the cloud and that is refreshed on a periodic basis, such as every six months. In another embodiment, the processed performance data may be compared with similar data from a fleet of machines that belong to or are associated with the enterprise. The customer will have access to performance data of machines of the similar classes with similar characteristics and machines that are performing similar tasks to get a permeance ranking and a baseline comparison for the expected productivity. For example, how well a particular wheel loader with attachments A and B performs digging when compared to other wheel loaders (already studied) of the same size with the same attachments.

Figure 2:
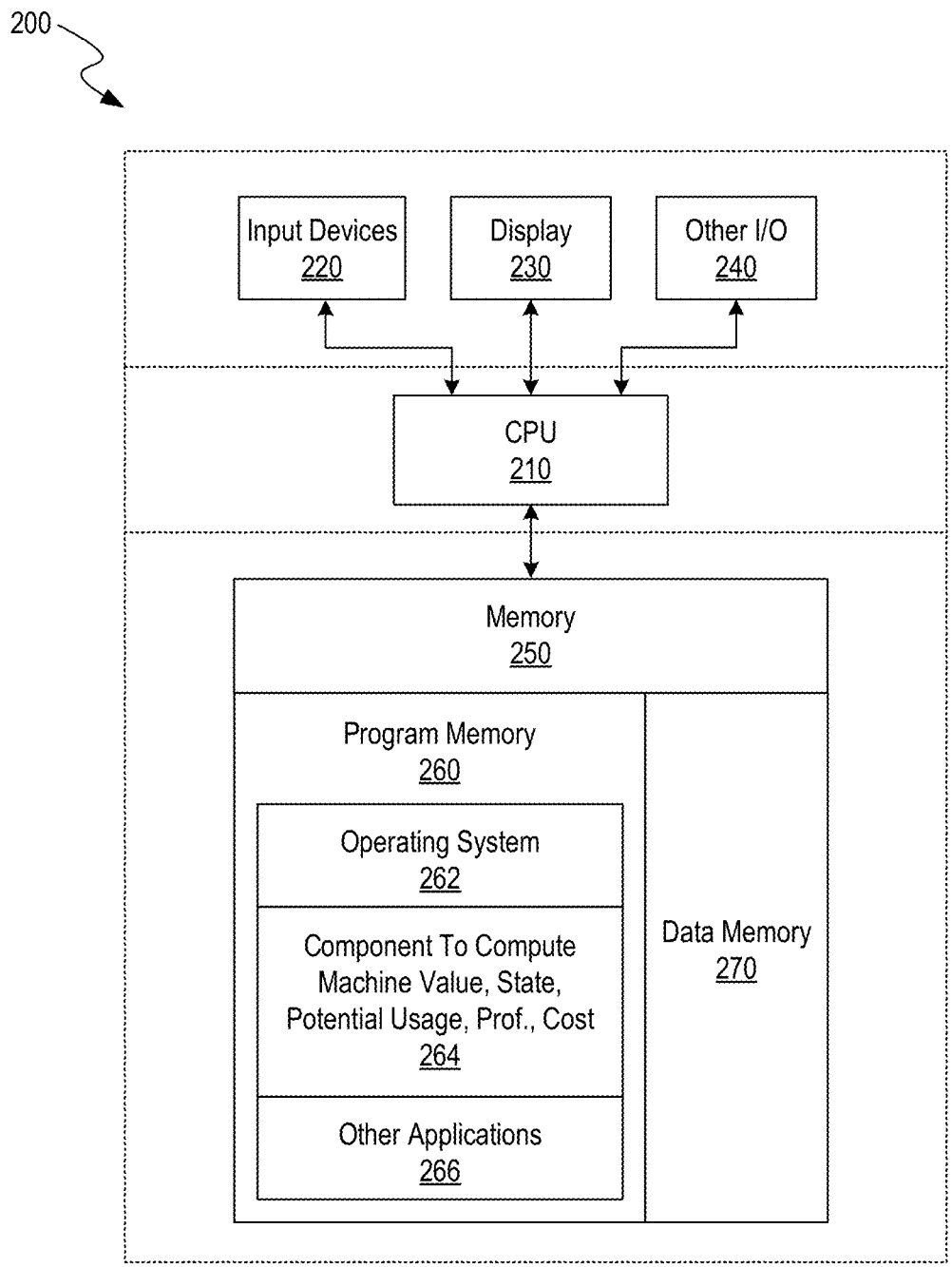
FIG. 2 is a block diagram illustrating an overview of devices on which some implementations can operate.

Several implementations are discussed below in more detail in reference to the figures. FIG. 2 is a block diagram illustrating an overview of devices on which some implementations of the disclosed technology can operate. The devices can comprise hardware components of a device 200 that computes a machine's value and mechanical state and computes the machine's potential usage, profitability, and cost of ownership, for example. Device 200 can include one or more input devices 220 that provide input to the CPU (processor) 210, notifying it of actions. The actions are typically mediated by a hardware controller that interprets the signals received from the input device and communicates the information to the CPU 210 using a communication protocol. Input devices 220 include, for example, a mouse, a keyboard, a touchscreen, an infrared sensor, a touchpad, a wearable input device, a camera- or image-based input device, a microphone, or other user input devices.

CPU 210 can be a single processing unit or multiple processing units in a device or distributed across multiple devices. CPU 210 can be coupled to other hardware devices, for example, with the use of a bus, such as a PCI bus or SCSI bus. The CPU 210 can communicate with a hardware controller for devices, such as for a display 230. Display 230 can be used to display text and graphics. In some examples, display 230 provides graphical and textual visual feedback to a user. In some implementations, display 230 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 240 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 200 also includes a communication device capable of communicating wirelessly or wire-based with a network node. The communication device can communicate with another device or a server through a network using, for example, TCP/IP protocols. Device 200 can utilize the communication device to distribute operations across multiple network devices.

The CPU 210 can have access to a memory 250. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 250 can include program memory 260 that stores programs and software, such as an operating system 262, Component To Compute Machine Value, State, Potential Usage, Profitability, and Cost of Ownership 264, and other application programs 266. Memory 250 can also include data memory 270 that can include database information, etc., which can be provided to the program memory 260 or any element of the device 200.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 3:
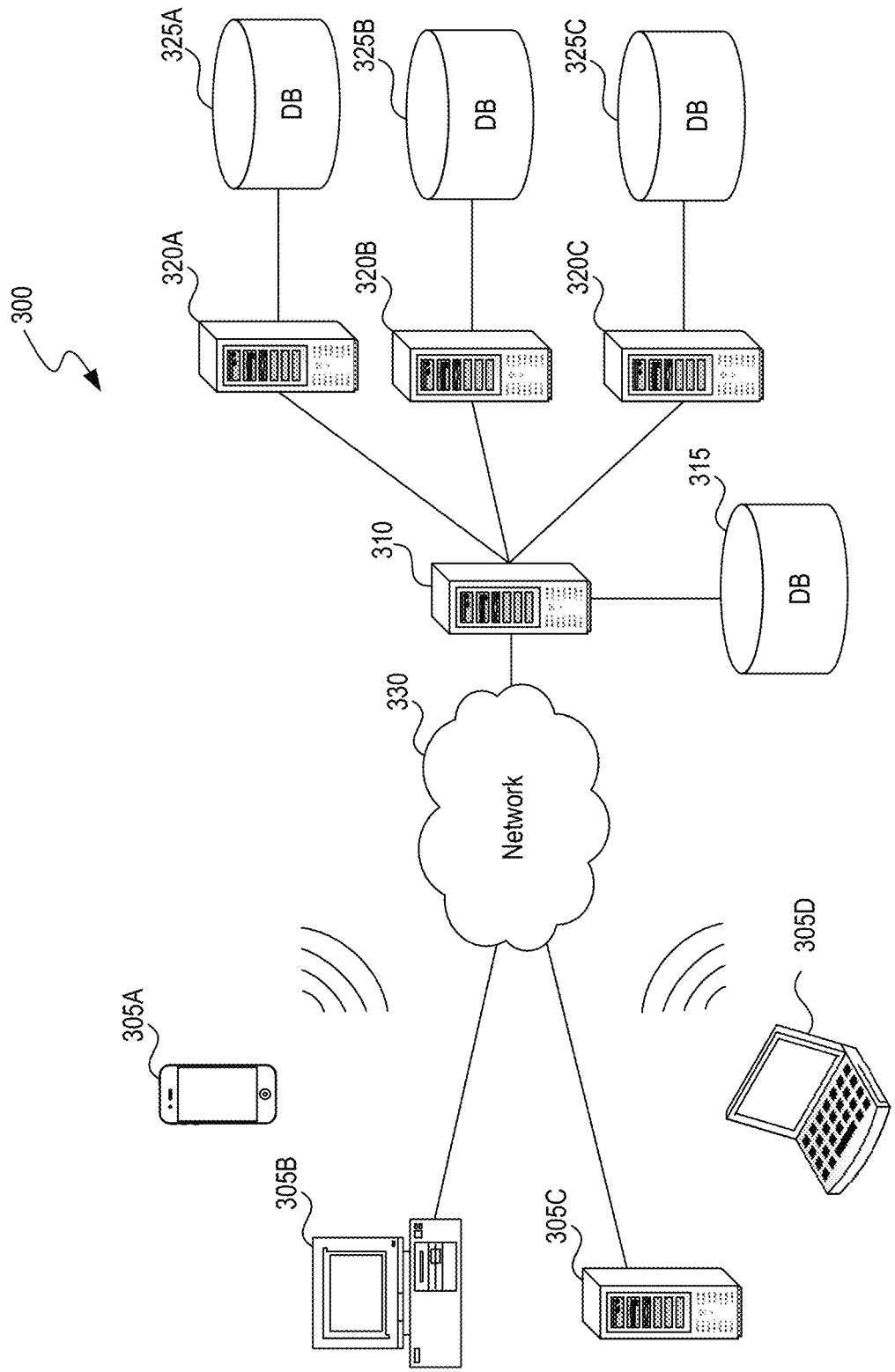
FIG. 3 is a block diagram illustrating an overview of an environment in which some implementations can operate.

FIG. 3 is a block diagram illustrating an overview of an environment 300 in which some implementations of the disclosed technology can operate. Environment 300 can include one or more client computing devices 305A-D, examples of which can include device 200. Client computing devices 305 can operate in a networked environment using logical connections through network 330 to one or more remote computers, such as a server computing device 310.

In some implementations, server computing device 310 can be an edge server that receives client requests and coordinates fulfillment of those requests through other servers, such as servers 320A-C. Server computing devices 310 and 320 can comprise computing systems, such as device 300. Though each server computing device 310 and 320 is displayed logically as a single server, server computing devices can each be a distributed computing environment encompassing multiple computing devices located at the same or at geographically disparate physical locations. In some implementations, each server computing device 320 corresponds to a group of servers.

Client computing devices 305 and server computing devices 310 and 320 can each act as a server or client to other server/client devices. Server 310 can connect to a database 315. Servers 320A-C can each connect to a corresponding database 325A-C. As discussed above, each server 320 can correspond to a group of servers, and each of these servers can share a database or can have their own database. Databases 315 and 325 can warehouse (e.g., store) information. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN) or a wide area network (WAN), but can also be other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
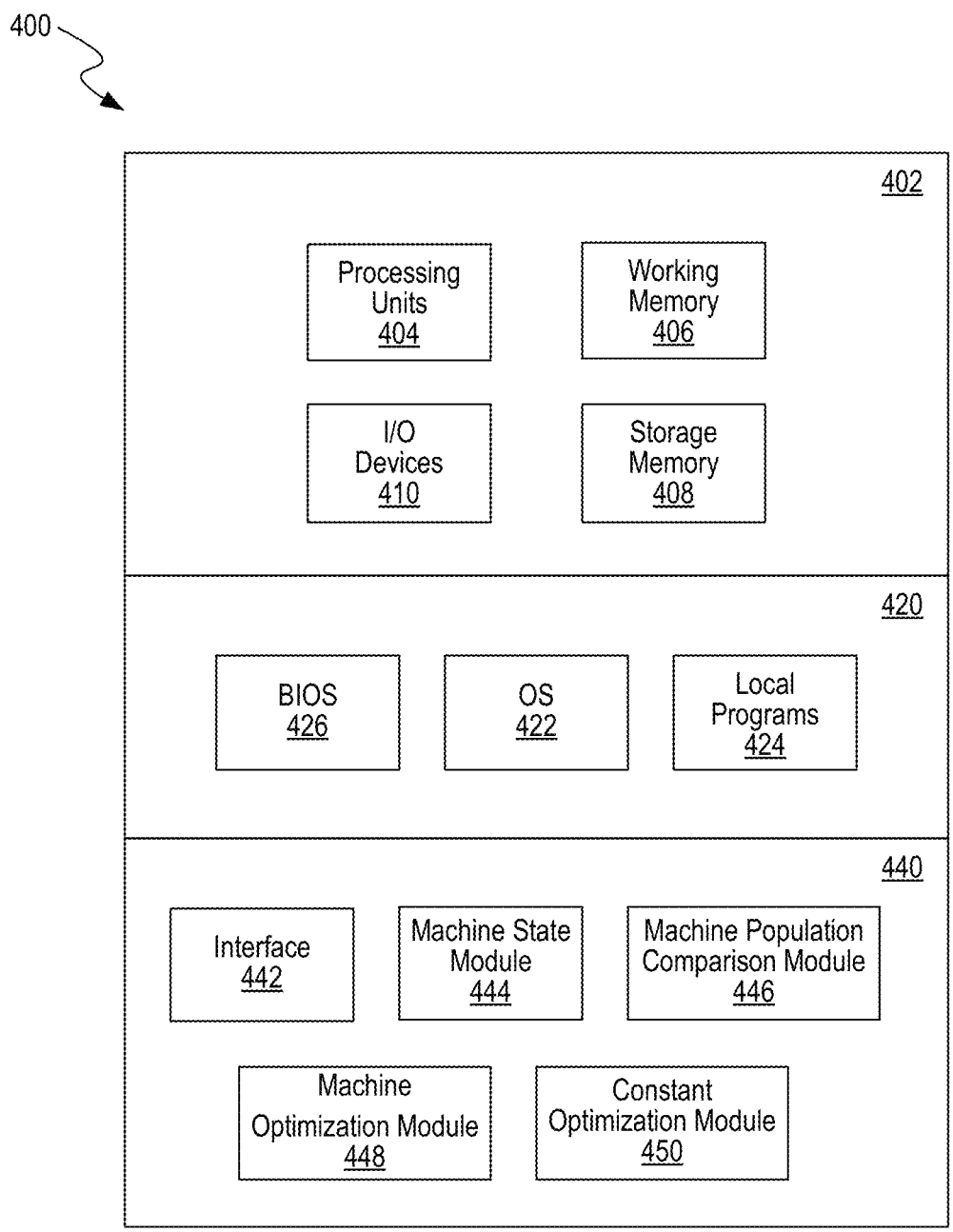
FIG. 4 is a block diagram illustrating components which, in some implementations, can be used in a system employing the disclosed technology.

FIG. 4 is a block diagram illustrating components 400 which, in some implementations, can be used in a system employing the disclosed technology. The components 400 include hardware 402, general software 420, and specialized components 440. As discussed above, a system implementing the disclosed technology can use various hardware, including processing units 404 (e.g., CPUs, GPUs, APUs, etc.), working memory 406, storage memory 408, and input and output devices 410. Components 400 can be implemented in a client computing device such as client computing devices 205 or on a server computing device, such as server computing device 310 or 320.

General software 420 can include various applications, including an operating system 422, local programs 424, and a basic input output system (BIOS) 426. Specialized components 440 can be subcomponents of a general software application 420, such as local programs 424. Specialized components 440 can include Machine State Module 444, Machine Population Comparison Module 446; Machine Optimization Module 448; Constant Optimization Module 450; and components that can be used for transferring data and controlling the specialized components, such as Interface 442. In some implementations, components 400 can be in a computing system that is distributed across multiple computing devices or can be an interface to a server-based application executing one or more of specialized components 440.

Those skilled in the art will appreciate that the components illustrated in FIGS. 2-4 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

Figure 5:
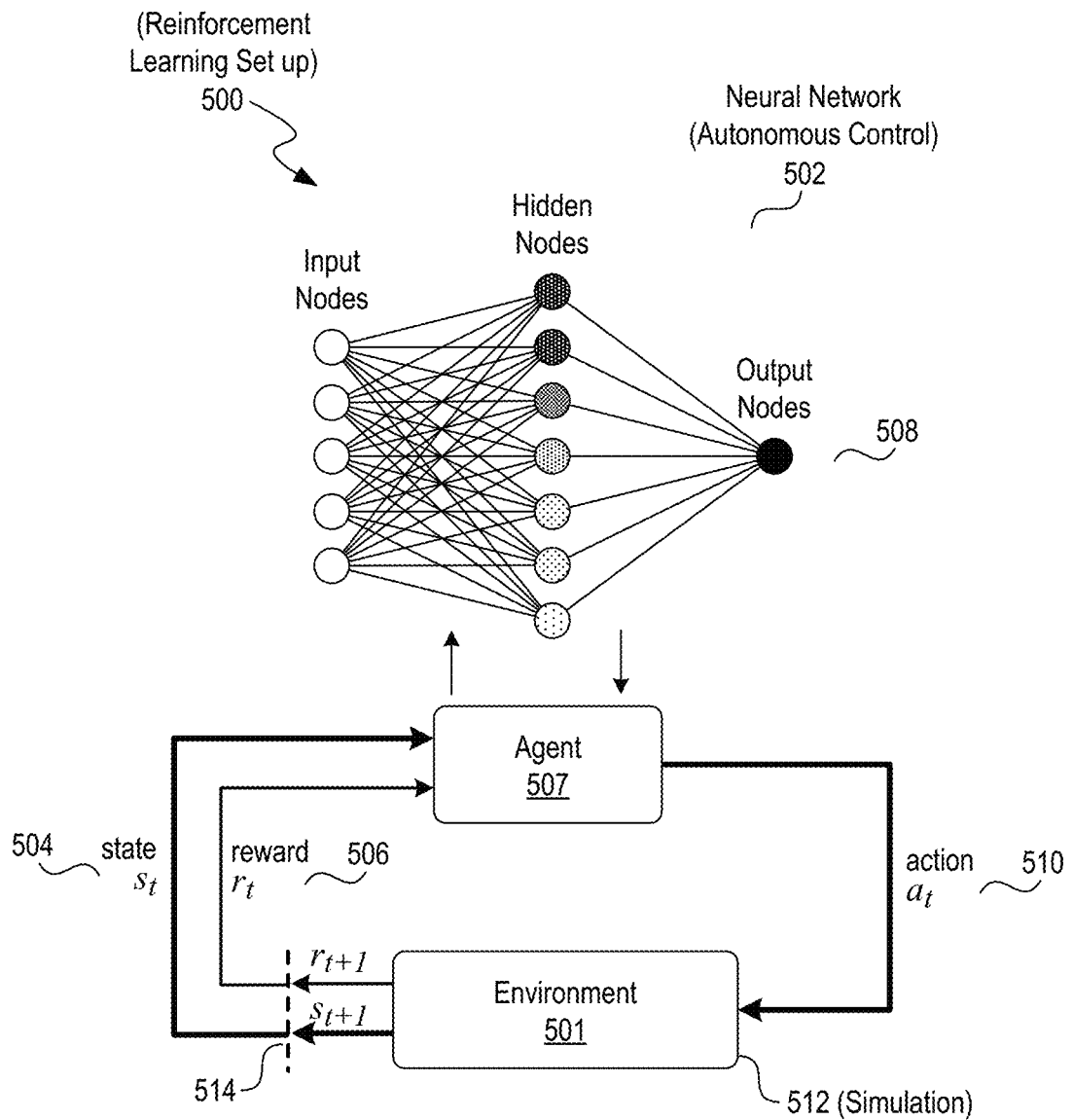
FIG. 5 is a schematic diagram of a reinforcement learning architecture, according to some embodiments of the disclosed technology.

An embodiment of a reinforcement learning process 500 can be understood with reference to FIG. 5. One or more autonomous controllers are trained and optimized by processing a neural network 502. Inputs from the environment 501, such as the current state 504 of a feature of the machine (e.g., as provided by the sensors) and a current reward 506, are fed via an agent processor 507 to the nodes of the model 508. The neural network 502 processes the input data and outputs an action 510, back to the environment 501. Examples of the outputs are redeploying customized autonomous features (e.g., auto-digging, auto-dumping, self-driving, auto-ripping, etc.) and offering operator tips to maintain a high productivity, referred to as operator coaching. As mentioned above, the collected data can then be used to further tune the virtual simulation and validate the prediction on the potential profitability 512. For example, having the engine RPM distribution for an application, such as digging, indicates how hard the machine is working or how difficult it is to dig into the target material. Hence, this information can be used to create more realistic simulations. Then, updated input 514, such as another iteration of the state and the reward data, are provided to the agent 507 to the neural network (502 and 508) to further fine tune the reinforcement learning 500.

An embodiment of a virtual simulator can be understood with reference to FIG. 6. FIG. 6 shows a graphical user interface of the physics model that simulates the behavior of the machine (including the behavior of the main components, such as the engine, transmission, after treatment system, power train, etc.) and the multiple physical interactions when the machine performs a task. For example, the simulator will record all the interactions for a virtual replica of the machine 602 digging into a simulated pile of dirt 604.

Thus, the updated feature can then be redeployed to the machine or, in the cases where the machine cannot support autonomous or semi-autonomous features, the module can then provide operation suggestions, such as how long the machine should be idle for or the timing and order for certain commands, expected RPM ranges and zones for applications.

INDUSTRIAL APPLICABILITY

The industrial applicability of the system and method for estimating a machine's potential usage, profitability, and cost of ownership based on machine's value and mechanical state will be readily appreciated from the foregoing discussion. It has been found that industrial equipment can be considered an asset. They cost a lot of money and can be expensive to maintain. In addition, they do valuable work. However, not every enterprise buys every industrial machine as new nor does every enterprise keep each and every owned industrial machine until such machine expires. That is, industrial machines can be sold from a first owner to a second owner. However, currently, there is no mechanism or technique that leverages the data from the machine's sensors, from the dealership records, from the first owner, from standardized reports, from similar machines, from a particular fleet of machines, and so on, and combines and processes such data in a machine state model, a machine population comparison model, a machine optimization model, and a constant optimization model, to generate and present the particular machine's potential usage, profitability, and cost of ownership.

In accordance with embodiments herein, the models can be generalized by using data from multiple machines in similar categories. If the machine is relatively new and has not been used heavily, the models are configured to still provide an accurate assessment. Legacy machines for which the system has not yet collected data can also be evaluated.

In accordance with embodiments herein, the innovation not only generates an estimate of the possibility of a breakdown or failure but also the performance impact on the specific application the machine is intended for and includes this informational data into the residual value of the machine. For example, the system can determine how much material can be moved per hour. An overused hydraulic system in an excavator's bucket cylinder does not yield the same cycle productivity as a new one. The costs savings in fuel consumption and the services on components and machines are an important aspect and another important aspect is the profit that customers can generate with such machines (productivity). Thus, the innovation provides productivity informational data that are a more accurate value estimation for the investment of a used machine.

In accordance with embodiments herein, the innovation determines and provides informational data about what operations and mechanical components the user can change or have changes to reach/maintain an optimal productivity/profitability. For example, the user or the system can then determine at what point is optimal to sell the machine. Also, the system can generate and provide the estimate of the machine's value to the customer (e.g., the expected profits).

In accordance with embodiments herein, the machines perform multiple operations such as, but not limited to, digging, dumping, caring, trenching, and ripping. The system generates and provides the costs and profits of performing each application.

In accordance with embodiments herein, the system determines and provides which applications the operator will be able to execute efficiently. Further, the system generates and provides the total cost of ownership if the buyer were to purchase the machine in its current state. Thus, the innovation provides operator coaching and how to run or operate the assets such that productivity is maximized.

In accordance with embodiments herein, the system obtains, and processes data reflecting insights from autonomous algorithms and features and is configured to improve such algorithms with future operator data. The system trains the autonomous algorithms to optimize productivity at the machine's current state. One substantial advantage here is that the system can tailor the machine to a particular operator and a particular type of work by formulating the machine's usage pattern for a constant line of work. Doing so will guarantee an expected behavior. That also allows the process to optimize maintenance costs, service schedules, and work productivity with the end of realizing the highest possible profits out of the customer's investment on a new or used Caterpillar machine. In addition, because the prediction is a customized suggestion on an operating pattern, this will help extend the lifetime of the machine, maintain performance and coach the operators with limited experience.

The foregoing discussion is applicable to industrial machines or equipment such as heavy machinery, a vehicle, construction equipment, and those belonging to a fleet of machines (e.g., such machines provided by Caterpillar, INC). Such machinery typically is employed at a customer site or a jobsite. Each such machine is previously embedded with sensors that monitor machine-related data and/or actions, such as but not limited to sensors that monitor oil temperature and certain actions of the operator of the machine (e.g., if the operator is operating the vehicle in an erratic way by performing operations that too quickly or out of a typical order). The sensors are configured to detect when certain data overcomes certain pre-determined thresholds and to report such data via a product link to a server (e.g., 104).

The server hosts one or more processors that are configured with programmed machine learning models that perform certain tasks (104, 106, 108, 110, 112, and 114). As discussed above, the models take various inputs from the machine (102, 116) (e.g., oil temperature), from external sources (e.g., dealership data), and from internal sources (e.g., stored historical data about the machine or about the customer employing the machine). The machine sensor data can be transmitted to the server on a periodic basis, when a change or trigger has occurred on the machine, or on-demand.

Once the machine profitability analysis process is initiated, the data is processed by the various models (106, 108, 110, and 112) discussed above. As discussed above, the outcome are projected results (114) which can be displayed in the customer-facing application (114, 102).

The disclosed technology, therefore, provides automatic determination of the machine's value and mechanical state, and can therefore determine the machine's potential usage, profitability, and cost of ownership. Thus, the disclosed technology can inform a first owner (the seller) and a second owner (the buyer) of the value of the machine going forward, as if they can look into a crystal ball.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "an embodiment" or "one embodiment" means that a particular feature, structure, or characteristic described in connection with the embodiment is included in at least one embodiment of the disclosure. The appearances of the phrase "in an embodiment" (or the like) in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

As used herein, the term "and/or" when used in the phrase "A and/or B" means "A, or B, or both A and B." A similar manner of interpretation applies to the term "and/or" when used in a list of more than two terms.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for computing a machine's potential usage, profitability, and cost of ownership by processing sensor data, comprising:

receiving, at a network-accessible server processor and from a machine at a jobsite of a customer, sensor data from one or more sensors of the machine;

further receiving, at the network-accessible server processor, service history data, previous dealership data, and owner input data;

processing, by a machine state module, the received sensor data, service history data, previous dealership data, and owner input data and generating a state of the machine and a state of each of individual components;

processing, by a machine population comparison module, the received sensor data, service history data, previous dealership data, and owner input data and generating a measure of projected productivity of the machine and an estimate of projected maintained life cycle and costs;

processing, by a machine optimization module, the state of the machine, the state of each of the individual components, the measure of the projected productivity of the machine and the estimate of the projected maintained life cycle and ownership costs and generating an optimal performance level of the machine and generating data indicative of the optimal performance level of the machine;

training the machine optimization module, including operations to:
  generate a virtual simulator of the machine using the state of the machine, the state of each of the individual components, the measure of the projected productivity of the machine and the estimate of the projected maintained life cycle and ownership costs;
  create, by the virtual simulator, a first training set of optimized autonomous controllers;
  train a reinforcement learning model using the first training set of optimized autonomous controllers;
  deploy the first training set of optimized autonomous controllers;
  responsive to deploying the first training set of optimized autonomous controllers, create a second training set of optimized autonomous controllers using: a second state of the machine, a second state of each of the individual components, a second measure of the projected productivity of the machine and a second estimate of the projected maintained life cycle and ownership costs;
  train the reinforcement learning model using the second training set of optimized autonomous controllers; and
  deploy the second training set of optimized autonomous controllers;

processing, by a cost of ownership and profitability module, the data indicative of the optimal performance level of the machine and generating productivity data of the machine; and transmitting, by a network-accessible server processor, the productivity data of the machine to a customer-facing application for display or post-processing;

wherein at least one of the network-accessible server processors is coupled to a memory.

2. The method of claim 1, further comprising:
providing a constant optimization module as a service module to stream sensor data of the machine as input to the machine optimization module on a periodic basis for further refinements thereof and to obtain performance data from the machine optimization module to compare against other machines.

3. The method of claim 1, wherein the sensor data comprises data from a temperature sensor, a pressure sensor, an accelerometer, a voltameter, a strain gauge, or a machine payload sensor.

4. The method of claim 1, wherein the owner input data comprises uploaded digital images or input text having a description of a machine job.

5. The method of claim 1, wherein the machine optimization module is configured to generate and provide operator coaching, wherein the operator coaching comprises tips to maintain a high productivity.

6. The method of claim 1, wherein the machine state module is configured to leverage application classification models to segment machine applications, process structural and component health models to compute application severity and cumulative machine damage, and combine the computed application severity and cumulative machine damage with productivity records to generate the state of the machine and the state of each of individual components.

7. A system for computing a machine's potential usage, profitability, and cost of ownership by processing sensor data, comprising:
  one or more processors; and
  one or more memory devices having stored thereon instructions that when executed by the one or more processors cause the one or more processors to:
    receive, at a network-accessible server processor and from a machine at a jobsite of a customer, sensor data from one or more sensors of the machine;
    further receive, at the network-accessible server processor, service history data, previous dealership data, and owner input data;
    process, by a machine state module, the received sensor data, service history data, previous dealership data, and owner input data and generate a state of the machine and a state of each of individual components;
    process, by a machine population comparison module, the received sensor data, service history data, previous dealership data, and owner input data and generate a measure of projected productivity of the machine and an estimate of projected maintained life cycle and costs;
    process, by a machine optimization module, the state of the machine, the state of each of the individual components, the measure of the projected productivity of the machine and the estimate of the projected maintained life cycle and ownership costs and generate an optimal performance level of the machine and to generate data indicative of the optimal performance level of the machine;
    train the machine optimization module, including operations to:
      generate a virtual simulator of the machine using the state of the machine, the state of each of the individual components, the measure of the projected productivity of the machine and the estimate of the projected maintained life cycle and ownership costs;
      create, by the virtual simulator, a first training set of optimized autonomous controllers;
      train a reinforcement learning model using the first training set of optimized autonomous controllers;
      deploy the first training set of optimized autonomous controllers;
      responsive to deploying the first training set of optimized autonomous controllers, create a second training set of optimized autonomous controllers using: a second state of the machine, a second state of each of the individual components, a second measure of the projected productivity of the machine and a second estimate of the projected maintained life cycle and ownership costs;
      train the reinforcement learning model using the second training set of optimized autonomous controllers; and
      deploy the second training set of optimized autonomous controllers;
    process, by a cost of ownership and profitability module, the data indicative of the optimal performance level of the machine and generate productivity data of the machine; and
    transmit, by a network-accessible server processor, the productivity data of the machine to a customer-facing application for display or post-processing.

8. The system of claim 7, wherein the instructions further comprise:

provide a constant optimization module as a service module to stream sensor data of the machine as input to the machine optimization module on a periodic basis for further refinements thereof and to obtain performance data from the machine optimization module to compare against other machines.

9. The system of claim 7, wherein the sensor data comprises data from a temperature sensor, a pressure sensor, an accelerometer, a voltameter, a strain gauge, or a machine payload sensor.

10. The system of claim 7, wherein the owner input data comprises uploaded digital images or input text having a description of a machine job.

11. The system of claim 7, wherein the machine optimization module is configured to generate and provide operator coaching, wherein the operator coaching comprises tips to maintain a high productivity.

12. The system of claim 7, wherein the machine state module is configured to leverage application classification models to segment machine applications, process structural and component health models to compute application severity and cumulative machine damage, and combine the computed application severity and cumulative machine damage with productivity records to generate the state of the machine and the state of each of individual components.

13. One or more non-transitory computer-readable media storing computer-executable instructions that, when executed by one or more processors, cause the one or more processors to perform operations comprising:

receiving, at a network-accessible server processor and from a machine at a jobsite of a customer, sensor data from one or more sensors of the machine;

further receiving, at the network-accessible server processor, service history data, previous dealership data, and owner input data;

processing, by a machine state module, the received sensor data, service history data, previous dealership data, and owner input data and generating a state of the machine and a state of each of individual components;

processing, by a machine population comparison module, the received sensor data, service history data, previous dealership data, and owner input data and generating a measure of projected productivity of the machine and an estimate of projected maintained life cycle and costs;

processing, by a machine optimization module, the state of the machine, the state of each of the individual components, the measure of the projected productivity of the machine and the estimate of the projected maintained life cycle and ownership costs and generating an optimal performance level of the machine to be and generating data indicative of the optimal performance level of the machine;

training the machine optimization module, including operations to:

generate a virtual simulator of the machine using the state of the machine, the state of each of the individual components, the measure of the projected productivity of the machine and the estimate of the projected maintained life cycle and ownership costs;

create, by the virtual simulator, a first training set of optimized autonomous controllers;

train a reinforcement learning model using the first training set of optimized autonomous controllers;

deploy the first training set of optimized autonomous controllers;

responsive to deploying the first training set of optimized autonomous controllers, create a second training set of optimized autonomous controllers using: a second state of the machine, a second state of each of the individual components, a second measure of the projected productivity of the machine and a second estimate of the projected maintained life cycle and ownership costs;

train the reinforcement learning model using the second training set of optimized autonomous controllers; and deploy the second training set of optimized autonomous controllers;

processing, by a cost of ownership and profitability module, the data indicative of the optimal performance level of the machine and generating productivity data of the machine; and transmitting, by a network-accessible server processor, the productivity data of the machine to a customer-facing application for display or post-processing.

14. The one or more non-transitory computer-readable media of claim 13, wherein the operations further comprise:

providing a constant optimization module as a service module to stream sensor data of the machine as input to the machine optimization module on a periodic basis for further refinements thereof and to obtain performance data from the machine optimization module to compare against other machines.

15. The one or more non-transitory computer-readable media of claim 13, wherein the sensor data comprises data from a temperature sensor, a pressure sensor, an accelerometer, a voltameter, a strain gauge, or a machine payload sensor.

16. The one or more non-transitory computer-readable media of claim 13, wherein the owner input data comprises uploaded digital images or input text having a description of a machine job.

17. The one or more non-transitory computer-readable media of claim 13, wherein the machine state module is configured to leverage application classification models to segment machine applications, process structural and component health models to compute application severity and cumulative machine damage, and combine the computed application severity and cumulative machine damage with productivity records to generate the state of the machine and the state of each of individual components.

\* \* \* \* \*